(12) United States Patent
Rayner

(10) Patent No.: US 10,761,350 B2
(45) Date of Patent: Sep. 1, 2020

(54) MULTI-FUNCTIONAL GLASSES AND EYEGLASSES

(71) Applicant: Gary Rayner, Henderson, NV (US)

(72) Inventor: Gary Rayner, Henderson, NV (US)

(73) Assignee: Gary Rayner, Henderson, NV (US)

( * ) Notice: Subject to any disclaimer, the term of this patent is extended or adjusted under 35 U.S.C. 154(b) by 6 days.

(21) Appl. No.: 15/059,244

(22) Filed: Mar. 2, 2016

(65) Prior Publication Data

US 2016/0259183 A1    Sep. 8, 2016

Related U.S. Application Data

(60) Provisional application No. 62/127,165, filed on Mar. 2, 2015.

(51) Int. Cl.
| | |
|---|---|
| *G02C 1/00* | (2006.01) |
| *G02C 11/04* | (2006.01) |
| *G02C 5/14* | (2006.01) |
| *G02C 11/00* | (2006.01) |

(52) U.S. Cl.
CPC ............ *G02C 11/04* (2013.01); *G02C 5/143* (2013.01); *G02C 11/10* (2013.01)

(58) Field of Classification Search
CPC . G02C 5/22; G02C 5/14; G02C 5/143; G02C 11/02; G02C 11/10; G02C 11/04
USPC ........ 351/111, 116, 118, 119, 121, 123, 158; 362/105
See application file for complete search history.

(56) References Cited

U.S. PATENT DOCUMENTS

| | | | | |
|---|---|---|---|---|
| 4,408,844 A | * | 10/1983 | Schoolman | E05B 19/00 351/111 |
| 5,223,861 A | * | 6/1993 | Wagner | G02C 5/143 351/111 |
| 5,430,503 A | * | 7/1995 | Colitz, Jr. | G02C 11/00 351/111 |
| 6,808,284 B1 | * | 10/2004 | Chao | G02C 11/04 362/105 |
| 7,362,222 B1 | * | 4/2008 | Holz | G08B 21/24 340/539.32 |
| 7,367,670 B2 | * | 5/2008 | Duane | G02C 5/143 351/121 |
| 7,556,374 B1 | * | 7/2009 | Cooper | G02C 5/143 351/112 |
| 2002/0008843 A1 | * | 1/2002 | Whisenant | G02C 5/22 351/119 |
| 2008/0100792 A1 | * | 5/2008 | Blum | G02C 5/143 351/44 |
| 2014/0139801 A1 | * | 5/2014 | DeCelles | G02C 5/143 351/111 |

* cited by examiner

*Primary Examiner* — Hung X Dang
(74) *Attorney, Agent, or Firm* — Mitnz, Levin, Cohn, Ferris, Glovsky and Popeo, P.C.

(57) ABSTRACT

This disclosure relates generally to eyewear apparatus that includes a frame configured to fit on the front of a wearer's face, in front of the eye area and over the bridge of the wearer's nose; and a first arm and a second arm that are configured to fit over the user's ears, in which each arm connects to the frame at a proximal point that is adjacent to the user's temple; in which at least one arm comprises a utility portion.

11 Claims, 2 Drawing Sheets

MULTI-FUNCTIONAL GLASSES AND EYEGLASSES

CROSS-REFERENCE TO RELATED APPLICATION

This application claims the benefit of U.S. patent application Ser. No. 62/127,165, filed on Mar. 2, 2015, and entitled "MULTI-FUNCTIONAL GLASSES AND EYEGLASSES," which is incorporated by reference herein in its entirety.

FIELD

This disclosure relates generally to eyewear apparatus and systems which include a frame portion that includes lenses that sit in front of a user's eyes, wherein eyewear apparatus and systems include arms, or temples, that connect to the frame and then extend backwards towards, and over the user's temples. The ends of the arms, or temples, that attach to the frame are the proximal ends, and the ends that extend towards the user's temples and ears are the distal ends. The distal ends of one or both arms can include implements that can help eliminate a number of items a user might carry in his or her pockets or bag.

BACKGROUND

Active persons, such as joggers, bicyclists, and skaters, will often wear sunglasses or other eyewear when out and about, particularly during the day. Such active persons might wish to reduce the number of items carried in pockets or bags. Items that can become cumbersome include keys, simple tools, light sources, and physiological monitoring devices.

SUMMARY

In some implementations, an eyewear apparatus is provided that may include a frame configured to fit on the front of a wearer's face, in front of the eye area and over the bridge of the wearer's nose; and a first arm and a second arm that are configured to fit over the user's ears, in which each arm may connect to the frame at a proximal point that is adjacent to the user's temple in which at least one arm comprises a utility portion.

The following features may be present in the eyewear apparatus in any suitable combination. The utility portion may include an implement detachably attached to one or more of: a distal portion on the arm; a proximal portion on the arm; and along the length of the arm. The implement may be permanently attached to the arm. In some such implementations of the eyewear apparatus, the implement may be removably attached to the first arm and a second implement is removably attached to the second arm. The implement may be configured to be used while attached to the arm in some implementations. The implement may be configured to be used after being removed from the arm of the eyewear apparatus. In some implementations of the eyewear apparatus, the implement may be configured to be interchanged with a second implement. In some such implementations, the second implement comprises a blank, wherein the blank conforms to the wearer's ear and holds the eyewear apparatus firmly on the wearer's face. The eyewear apparatus may further include an implement cover that covers the implement while the eyewear apparatus is worn. In some implementations, the first arm may include a first implement and the second arm comprises a second implement. In some such implementations, the first implement may be permanently attached to the first arm and the second implement may be permanently attached to the second arm. In some implementations, the first implement may be permanently attached to the first arm and the second may be removably attached to the second arm. Each arm with a permanently attached implement may also include an implement cover that covers the implement while the eyewear apparatus is worn. The first implement may be removably attached to the first arm and the second implement may be removably attached to the second arm.

In addition to including any of the features above in any suitable combination, in some implementations, the eyewear apparatus may be one in which the implement includes: a key, a screw driver, a drill bit, a cutting blade, a light, scissors, tweezers, an awl, a writing implement, an electronic memory device, an electrical signal emitting device, a near-field communication (NFC) transponder, an electronic payment transponder, an automatic toll or fare paying transponder, a sound emitting device, nail clippers, a file, a dental care implement, a cork-screw, a charging port, a medical condition monitoring device, a medication holding compartment, a light sensor, a camera, a scented liquid container and/or dispenser, a powdered drink/food container, an alcohol sensor that determines blood alcohol from a user's breath, a whistle, a receiver that indicates incoming messages and/or calls from a hand-held device connected to a haptic signal generator, a laser pointer, a sewing kit, hair maintenance tools or products, a compartment for money, one or more safety pins, make-up, one or more eating utensils, a wrench, a fish hook and string, name badges, one or more thermometers, one or more chemical detectors for use with ingestible liquids, or any combination thereof. In some such implementations, the electrical signal emitting device may include one or more of infrared signals, sonic signals, ultrasonic signals, RFID signals, Bluetooth signals, near-field communication signals, other electromagnetic based signals, signals to identify an object or person, signals to make electronic financial transaction, signals to control data or information flow, signals to remotely control devices, signals to open doors, signals to start cars, security related signals, signals for security identification, and signals for security access control that can limit the movement of items or persons into buildings, rooms, vaults, cabinets, or other secure locations. One or both of the arms of the eyewear apparatus may be configured to change appearance to indicate an environmental condition in some implementations of the eyewear apparatus. In such implementations, the environmental condition may include: temperature, UV light exposure, ambient light, or any combination thereof. The first arm and the second arm may change appearance in response to different environmental conditions. In some implementations of the eyewear apparatus, the frame may include a power source. The frame may be configured to emit light, wherein the emitted light includes flashing light, light emitted from LEDs located near the attachment point of one or both legs, light that is emitted in response to reduced ambient lighting, light that is emitted from fiber optics integrated into to the frame, light that is emitted depending on the use of one or more implements.

In a related aspect, a kit is provided in some implementations that include an eyewear apparatus as described above and one or more auxiliary implements that attach removably to at least one utility portion.

The following features may be included in the kit in any suitable combination. In some implementations, the kit may include the one or more auxiliary implements that includes a key, a screw driver, a drill bit, a cutting blade, a light, scissors, tweezers, an awl, a writing implement, an electronic memory device, an electrical signal emitting device, a near-field communication (NFC) transponder, an electronic payment transponder, an automatic toll or fare paying transponder, a sound emitting device, nail clippers, a file, a dental care implement, a cork-screw, a charging port, a medical condition monitoring device, a medication holding compartment, a light sensor, a camera, a scented liquid container and/or dispenser, a powdered drink/food container, an alcohol sensor that determines blood alcohol from a user's breath, a whistle, a receiver that indicates incoming messages and/or calls from a hand-held device connected to a haptic signal generator, a laser pointer, a sewing kit, a compartment for money, one or more safety pins, make-up, one or more eating utensils, a wrench, a fish hook and string, name badges, one or more thermometers, one or more chemical detectors for use with ingestible liquids, or any combination thereof. The electrical signal emitting device may include one or more of infrared signals, sonic signals, ultrasonic signals, RFID signals, Bluetooth signals, near-field communication signals, other electromagnetic based signals, signals to identify an object or person, signals to make electronic financial transaction, signals to control data or information flow, signals to remotely control devices, signals to open doors, signals to start cars, security related signals, signals for security identification, and signals for security access control that can limit the movement of items or persons into buildings, rooms, vaults, cabinets, or other secure locations. In some implementations, the kit may further include one or more auxiliary legs that are configured to removably attach to the frame. In some such implementations, the one or more auxiliary implements may be attached to the one or more auxiliary legs at the utility portion of each auxiliary leg.

In a further related aspect, a method is provided that includes combining a frame configured to fit on the front of a wearer's face, in front of the eye area and over the bridge of the wearer's nose with a first arm and a second arm that are configured to fit over the user's ears, in which each arm connects to the frame at a proximal point that is adjacent to the user's temple, and in which at least one arm comprises a utility portion.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE FIGURES

Like reference symbols in the various drawings indicate like elements.

DETAILED DESCRIPTION OF THE DISCLOSURE

Figure 1A:
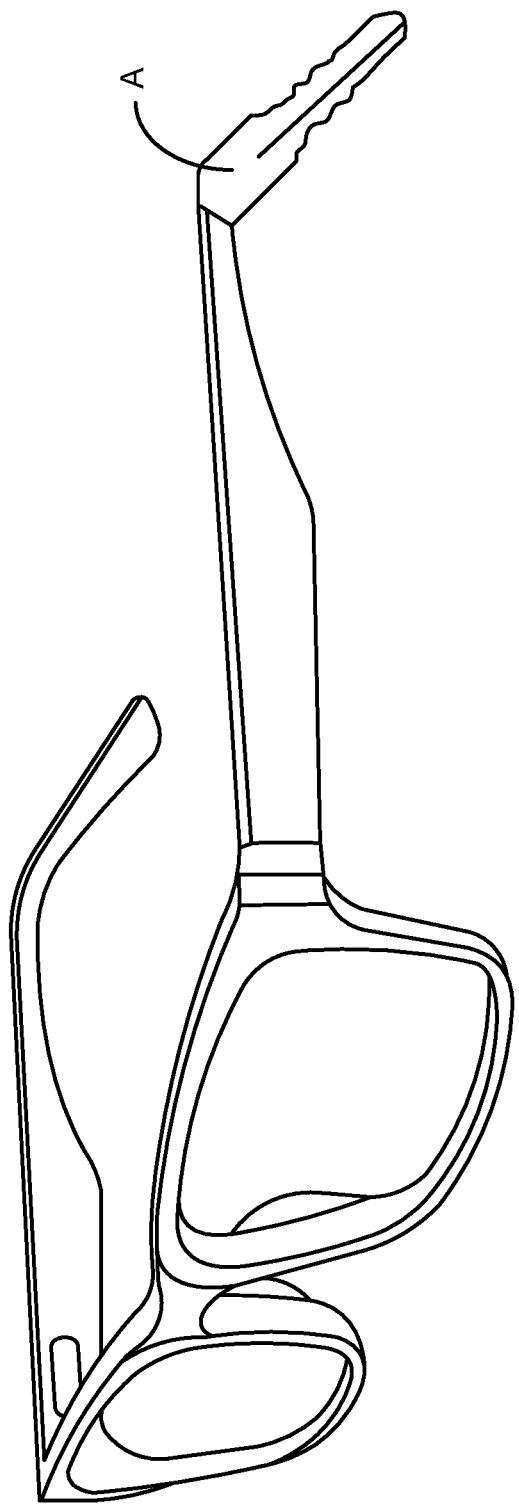
FIG. 1a shows an eyewear apparatus with an implement at the end of one arm.

An active person may not wish to carry numerous items in pockets or a bag, as well as wear eyewear. As such, improved eyewear is needed that can accommodate the active person's need for eye protection or enhanced vision as well as a reduced number of items moving around in pockets or needed to be carried in bags. Provided herein are eyewear apparatus and system that allow an active person to use eyewear and eliminate at least one item from the list of essential items he or she carries in a pocket or bag.

Eyewear Apparatus

The eyewear apparatus includes multiple parts: a frame and two arms, or temples, that extend from the frame over a wearer's temple towards the ear area. The frame is generally configured to be worn in front of the wearer's eyes, with a portion that sits on or above the bridge of the wearer's nose. The frame is configured to hold a pair of lenses when in use, one for the left eye and one for the right eye. The arms can connect to the frame in areas that are located towards the outer edges of the frames, away from the bridge portion. The arms can attach removably or permanently to the frame. A hinge, a snap fitting, a quick release fitting, a ball and socket fitting, a magnetic coupling mechanism, a spring clasp, a screw fitting, a cam-lock fitting, hook and loop strap attachments (e.g. Velcro®), a flexible elastomer connection, a compression fitting, releasable and reusable adhesive connection, interference fittings using pins and sockets, or any other suitably robust fitting or connection can attach the arms to the frames.

The frame can be made of any suitable material or combination of materials, including light-weight materials of one or different moduli, such that the frame has varying stiffness across the area of the frame. The materials of the frame can include polymers, epoxy resins, ceramics, metals, composite materials or any combination thereof. It can be desirable for the frame to have additional functionality, such that the frames are capable of doing something besides holding lenses in place. The frame can emit light; reflect light; change appearance (e.g. color) in response to environmental conditions; carry a power source; have a port for recharging a power source; include photovoltaic or mechanical means for generating electricity that may be used immediately or stored in the frame; include one or more ports for memory storage devices; include one or more ports for radio frequency, Bluetooth, low-energy Bluetooth, or other suitable types of signal communication; include one or more transponders or transmitters for indicating the presence and/or status of the frames (e.g., low-energy Bluetooth, ZigBee®, and similar transmitters); include a camera; include a light sensor; or any combination thereof.

The emitted light can include a flashing light, light emitted from light-emitting diodes (LEDs) located near the attachment point of one or both legs, light that is emitted in response to reduced ambient lighting, light that is emitted from fiber optics integrated into to the frame, light that is emitted depending on the use of one or more implements, or any combination thereof. Emitted light can be shielded from the wearer's field of view either by the design of the frames or due to the nature of the lenses.

The lenses in a frame may serve more than one purpose, such as to enhance the wearer's view while accomplishing another task. In some implementations, the lenses can work with the frame to generate electricity, such as by including photovoltaic materials in the lenses that produce a current that may be used or stored by the frame. Alternatively, or additionally, the lenses may act as antenna for signal receiving or sending purposes. Further, the lenses may be used to display information to the wearer to present an augmented reality; keep the wearer apprised of his or her own status; or to notify the wearer of incoming information or activity to an auxiliary device, such as a mobile phone.

The arms are minimally for keeping the eyewear on the face of the wearer. In the eyewear apparatus described herein, one or both of the arms can include an implement to help reduce the number of items a wearer needs to bring with him or her when using the eyewear. The implement can be located on the distal portion of the arm; that is to say that the implement can be located on the portion of the arm that is in the area near the wearer's ear. The implement can be removably or permanently attached to the arm. The arm can be configured for use of the implement while it is attached to the arm or while the implement is removed from the arm. It is possible that both arms of the eyewear include implements at the distal portions. When both arms have implements, the implements can both be permanently attached or removably attached, or one implement can be permanently attached and the other, removably attached.

FIG. 1a shows an eyewear apparatus in which one arm includes an implement A at the distal portion of the arm. The implement A shown is a key. This key can be a house key, a car key, a locker key, or the like. The key can also include an electronic chip, such as used in an automobile key. The arm can be provided to a user as a key blank, and the user, who can be the wearer, can take the blank to a key smith, key cutting facility, auto dealer, or the like to create the desired key. The implement A can be used while attached to the arm of the eyewear apparatus. Alternatively, the implement A can be attached to the arm in a removable manner and can be used once removed from the arm. The implement can partially or entirely fit into a slot or other volume created in the distal portion of the arm.

Figure 1F:
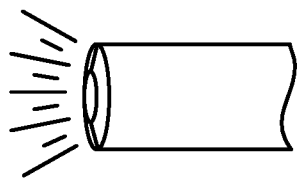
FIG. 1f shows an alternate implement that is a light source.
Figure 1E:
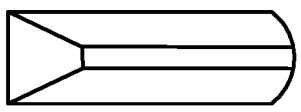
FIG. 1e shows an alternate implement that is a flat head screwdriver.
Figure 1D:
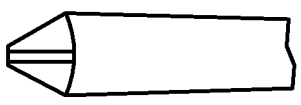
FIG. 1d shows an alternate implement that is a Philips head screwdriver.
Figure 1C:
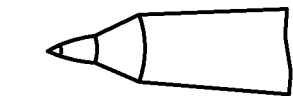
FIG. 1c shows an alternate implement that is a writing implement.
Figure 1B:
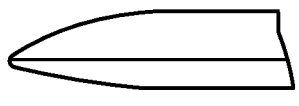
FIG. 1b shows an alternate implement that is a knife blade.

FIGS. 1b-1f show other potential implements that can be attached to the arm in place of the key implement A. FIG. 1b shows a knife or blade. FIG. 1c shows a writing implement, such as a ball-point pen. Other writing implements could be a felt tipped pen, a pencil, a mechanical pencil, and the like. FIGS. 1d and 1e show screwdriver tips; 1d is a Phillips head screwdriver and 1e is a flat head screwdriver. FIG. 1f shows a light emitting device, such as a light-emitting diode (LED) light, a fiber optic light, a small incandescent light, and the like.

The implement can include: a key, a screw driver, a drill bit, a cutting blade, a light, scissors, tweezers, an awl, a fishing line and hook, a writing implement, an electronic memory device, an electrical signal emitting device, a near-field communication (NFC) transponder, an electronic payment transponder, an automatic toll or fare paying transponder, a sound emitting device, nail clippers, a file, a dental care implement, a cork-screw, a charging port, a charging or data transmitting cable or cord, a medical condition monitoring device, a medication holding compartment, a dose of liquid medicament, a syringe and needle prefilled with a medication, a light sensor, a camera, a scented liquid container and/or dispenser, a fire starting implement (e.g., a flint, a match, a lighter), a chewing gum holder for new or chewed gum, a cigarette holder, a tobacco holding compartment (e.g., a snuff compartment, a loose tobacco compartment), an herbal remedy container/compartment, a powdered drink/food container, an alcohol sensor that determines blood alcohol from a user's breath, a whistle, a receiver that indicates incoming messages and/or calls from a hand-held device connected to a haptic signal generator, a laser pointer, a magnet, a sewing kit, hair maintenance tools or products, a compartment for money, one or more safety pins, make-up, one or more eating utensils, a wrench, a fish hook and string, name badges, one or more sensors, one or more chemical detectors for use with ingestible liquids, or any combination thereof.

The one or more sensors may include one or more thermometers, a Geiger counter, a UV exposure sensor, a gaseous or liquid toxin or poison sensor, or any combination thereof. The one or more sensors may connect to a hand-held device, such as a mobile phone, for data output. The eyewear may include a leash, cable, cord, or other mechanism to anchor the eyewear to the wearer. In some implementations, the leash, cable, or cord may enable the implement to connect to a hand-held device worn or used by the wearer. For example, when the implement is a sensor, the implement or another part of the eyewear can include a port for connecting the sensor to a hand-held device for viewing the sensor data. Additionally, or alternatively, the leash, cable, or cord may enable the implement to connect to a power source, that recharges a battery in the eyewear. The power source that recharges a battery in the eyewear may be a hand-held device battery or a desktop device that is directly connected to a power source.

The leash, cable, cord, or the like may attach to one or both of the arms of the eyewear and may include a clip or clasp to enable the wearer to attach the eyewear to clothing if it is not attached to a device. The leash, cable, cord, or the like may not be configured to connect to a device, and may be configured only to prevent the eyewear from inadvertent removal from the wearer. Materials for the leash, cable, cord, or the like may include plastic material that minimally stretches, electrical wiring, textile material, elastic material, or any combination thereof.

Figure 2:
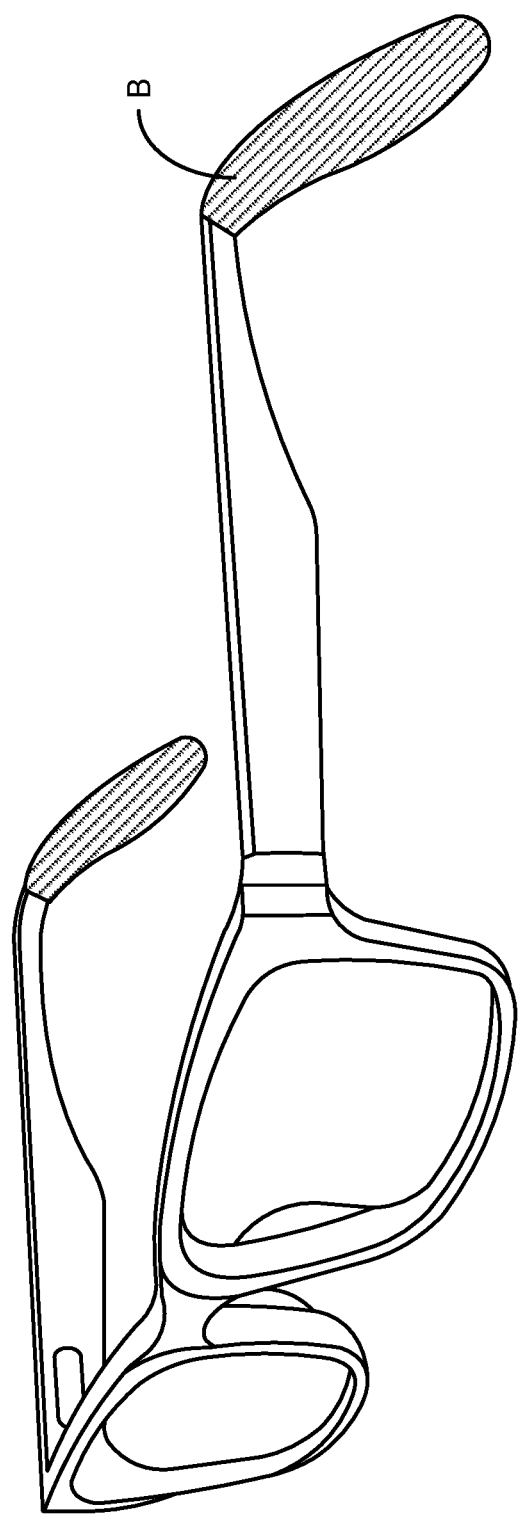
FIG. 2 shows an eyewear apparatus with covers B over the distal ends of the arms.

The eyewear apparatus can further include covers for the implements. The covers can be made of plastic, rubber, a polymer, metal, or any other material that is capable of covering the implement and protecting the back of the wearer's ear from the implement. FIG. 2 shows an eyewear apparatus with covers B over the distal ends of the arms. The covers can provide protection to the wearer from the implementation, for example to avoid abrasion or cutting of the wearer. The covers can also help to indicate which implements are attached to the arms, for example by having a different color, mark, text, symbol, or pattern for each type of implement.

Arms and/or the implements can also have functionality that extends beyond that added by the implements which are at the distal portions during wear. The arms and/or the implements can change appearance (e.g., color) in response to environmental conditions. The environmental conditions can include temperature, UV light exposure, ambient light, or any combination thereof. Additionally, the arms and/or the implements can emit light, contain light sensors, or both contain light sensors and emit light. The arms and/or the implements can include power sources and charging means to recharge the power sources. The power sources can be used to power the light emitting portions, the sensors, or both. The arms and/or the implements can also be programmable and can be programmed to emit signals, such as infrared signals, sonic (e.g. sound) signals, ultrasonic signals, RFID signals, Bluetooth signals, near-field communication signals, or other electromagnetic based signals, such as are used to identify an object or person, to make electronic financial transaction (e.g., payments), to control data or information flow, to remotely control devices, to open doors, or to start cars. Other types of signals that can be emitted by the arms and/or implements of the eyewear can include security related signals, for example security identification and security access control that can limit the movement of items or persons into buildings, rooms, vaults, cabinets, or other secure locations. The signals to remotely control devices may include infrared, Bluetooth, or other signals. The devices that may be remotely controlled may include televisions, computers, music playing devices, video displaying devices, temperature controlling devices, environmental control devices, and the like. The arms can also be or include digital storage devices. Alternatively, the arms can be configured to hold or read digital storage devices such as USB flash drives, SD cards, micro SD cards, and the like.

Though the above implements are described as being located at the distal end of one or more arms of an eyewear apparatus, it should be noted that implements can be located at the proximal end of one or more arms of an eyewear apparatus. Alternatively, or additionally, one or both arms of an eyewear apparatus can have implements located at either the distal end, proximal end, or both the distal and proximal end. In some implementations of an eyewear apparatus, an arm can have more than one implement at either the distal or proximal end. To accommodate more than one implement at an end of an arm, the arm can include multiple stacked implements that may be exposed by pulling out an implement, such that it pivots about a connection point to the arm or such that the implement is completely free of the arm. Further, some implements may require additional leverage to operate optimally. Implements that require more leverage may be attached to an arm to use the arm for leverage or may allow for the attachment of another piece, perhaps held within the arm or the additional arm of the eyewear apparatus.

In some cases, the entire length of an arm can serve as the implement, serving as the implement when the arm is detached from the frame. Such implements can include telescoping arms that lengthen when pulled or twisted. For example, the arm can double as a straw, and two arms can be used as chop sticks. The entire length of an arm can be used to encapsulate a useful item, such as two or more portions of the arm screw or slide together for wear. Inside of such an encapsulating arm can be rolled up paper, such as money or note paper; medication; a small tooth brush or a hair brush; a telescoping or expanding item; or an item that in turn slides or screws onto the encapsulating portions of the arm. Further, utility items that can serve as the implement can attach to the arm, along the length of the arm, via magnets, clips, hook and loop fittings, and the like. Further, implements can be located along the length of arms of a conventional eyewear apparatus and attach via one or more of a latch, an adhesive, an elastic or elastomer sleeve or band, a magnet, a clamp, a formable wire, and the like.

As described above, the ability to add functionality to glasses by including implements on or integrated into arms and/or the frame of an eyewear apparatus allows a wearer to minimize the amount of items carried in pockets, bags, pouches, and the like. Alternatively, or additionally, the added functionality may enable a wearer to conceal items used to maintain security or secrecy, for example keys, electronic security signals, sensitive documents, medications, cash, and the like.

Systems of Eyewear

As mentioned hereinabove, both arms of the eyewear apparatus can include implements. In addition to the implements being interchangeable, such that the main implement can be exchanged for an auxiliary implement, entire arms can be exchanged. For example, if two users wish to alternate wearing the glasses, and one wearer prefers to have screwdrivers, and the second wearer prefers eating utensils, it is possible for each wearer to keep track of his or her arms. Also, two or more frames with the same or different types of lenses may be exchanged by one or more user.

The implementations set forth in the foregoing description do not represent all implementations consistent with the subject matter described herein. Instead, they are merely some examples consistent with aspects related to the described subject matter. Wherever possible, the same reference numbers will be used throughout the drawings to refer to the same or like parts.

Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. Similarly, elements located on the front, back, side, top, or bottom of an embodiment or implementation are to be understood as relatively positioned, unless otherwise specified. Other embodiments can be within the scope of the claims.

What is claimed is:

1. An eyewear apparatus comprising:
   a frame formed of a boundary member configured to fit on the front of a wearer's face and having two circumferential portions, each circumferential portion positioned in front of an eye area of a wearer and being configured to retain a lens, the circumferential portions being coupled together by a bridge element adapted to fit over the bridge of the wearer's nose; and
   a first and a second extended arm member, each extended arm member being composed of a surface component bounding a cavity and having a proximal portion and a distal portion, each proximal portion of the extended arm being movingly coupled to a respective circumferential portion at a position adjacent to the wearer's temple, and each distal portion of the extended arm being configured to fit over the wearer's ear, wherein each arm connects to the frame at a proximal point that is adjacent to the user's temple; wherein at least one arm comprises a utility portion, at least one of the cavities housing an electronic module including an electronic chip, a memory device, a rechargeable power source, and a communications unit comprising an electromagnetic signal emitter.

2. The eyewear apparatus of claim 1, wherein the electromagnetic signal emitter comprises a transponder.

3. The eyewear apparatus of claim 2, wherein the transponder comprises one or more of a near-field communication (NFC) transponder, an electronic payment transponder, and an automatic toll or fare paying transponder.

4. The eyewear apparatus of claim 3, wherein the transponder is configured for effectuating an electronic transaction.

5. The eyewear apparatus of claim 4, wherein the electronic transaction is a commercial transaction.

6. The eyewear apparatus of claim 2, wherein the electromagnetic signal emitter is configured for emitting an RFID signal.

7. The eyewear apparatus of claim 6, wherein the RFID signal is configured for remotely controlling a device.

8. The eyewear apparatus of claim 7, wherein the RFID signal is used to identify a wearer of the eyewear.

9. The eyewear apparatus of claim 8, wherein the device comprises a door, a computing device, an audio-visual device, an automotive device, and an environmental control device.

10. The eyewear apparatus of claim 9, wherein the device is controlled so as to grant access.

11. The eyewear apparatus of claim 9, wherein the communications module further includes a Bluetooth transmitter.

* * * * *